United States Patent

[11] 3,633,947

| [72] | Inventor | Carl J. Nelson |
| | | Elmira, N.Y. |
| [21] | Appl. No. | 12,940 |
| [22] | Filed | Feb. 20, 1970 |
| [45] | Patented | Jan. 11, 1972 |
| [73] | Assignee | Corning Glass Works |
| | | Corning, N.Y. |

[54] COUPLING
10 Claims, 14 Drawing Figs.

[52] U.S. Cl.................................................. 285/233,
24/16 PB, 285/236, 285/DIG. 12, 285/DIG. 22, 285/423
[51] Int. Cl...................................................... F16l 49/00
[50] Field of Search............................................ 285/233,
236, 373, 252, DIG. 12, DIG. 22, 235, 365, 407,
408, 419, 423, 321; 24/16 PB, 16 R, 20

[56] References Cited
UNITED STATES PATENTS

| 3,376,055 | 4/1968 | Donroe | 285/423 X |
| 3,321,811 | 5/1967 | Thomas | 285/252 X |
| 210,560 | 12/1878 | Robertshaw | 285/252 X |
| 1,098,620 | 6/1914 | Gillar | 285/419 X |
| 3,527,484 | 9/1970 | Walkden | 285/423 X |
| 823,591 | 6/1906 | Eager | 285/407 X |
| 3,365,754 | 1/1968 | Geisinger | 24/16 PB |
| 3,540,224 | 11/1970 | Pogonowski | 285/321 X |
| 2,395,745 | 2/1946 | King | 285/233 X |
| 3,419,291 | 12/1968 | Tomb et al | 285/233 |
| 3,266,109 | 8/1966 | Thomas | 24/20 |

*Primary Examiner*—Thomas F. Callaghan
*Attorneys*—Clarence R. Patty, Jr. and Ernst H. Ruf ABSTRACT: A coupling for joining two pipe end sections, the coupling having a resilient liner surrounding the pipe ends and a force-developing member enveloping the liner and including a flexible, generally cylindrical, one-piece band having end sections capable of overlapping. These end sections have complementary locking means capable of stepped interlocking engagement over a predetermined distance upon application of an external force. The band also includes bridging means for maintaining an essentially continuous inner surface between the band end sections, and optionally, a barrier means may be interposed between the liner and the pipe ends.

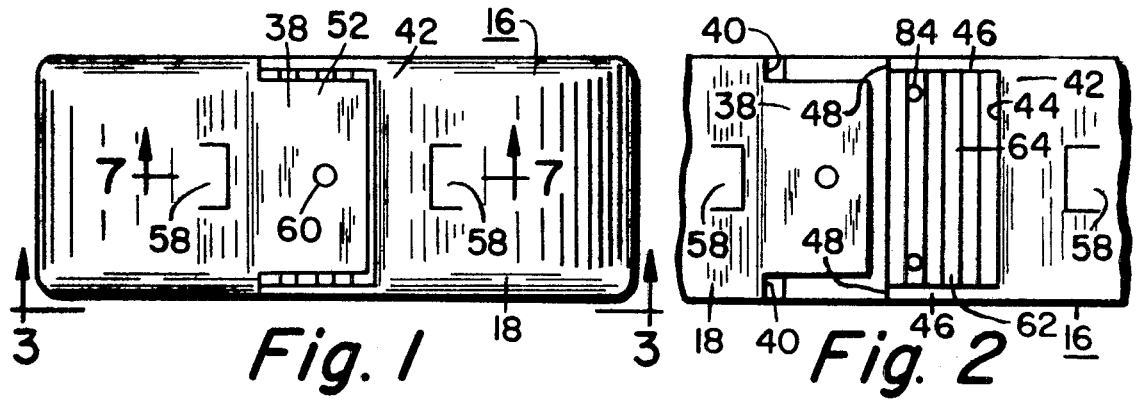
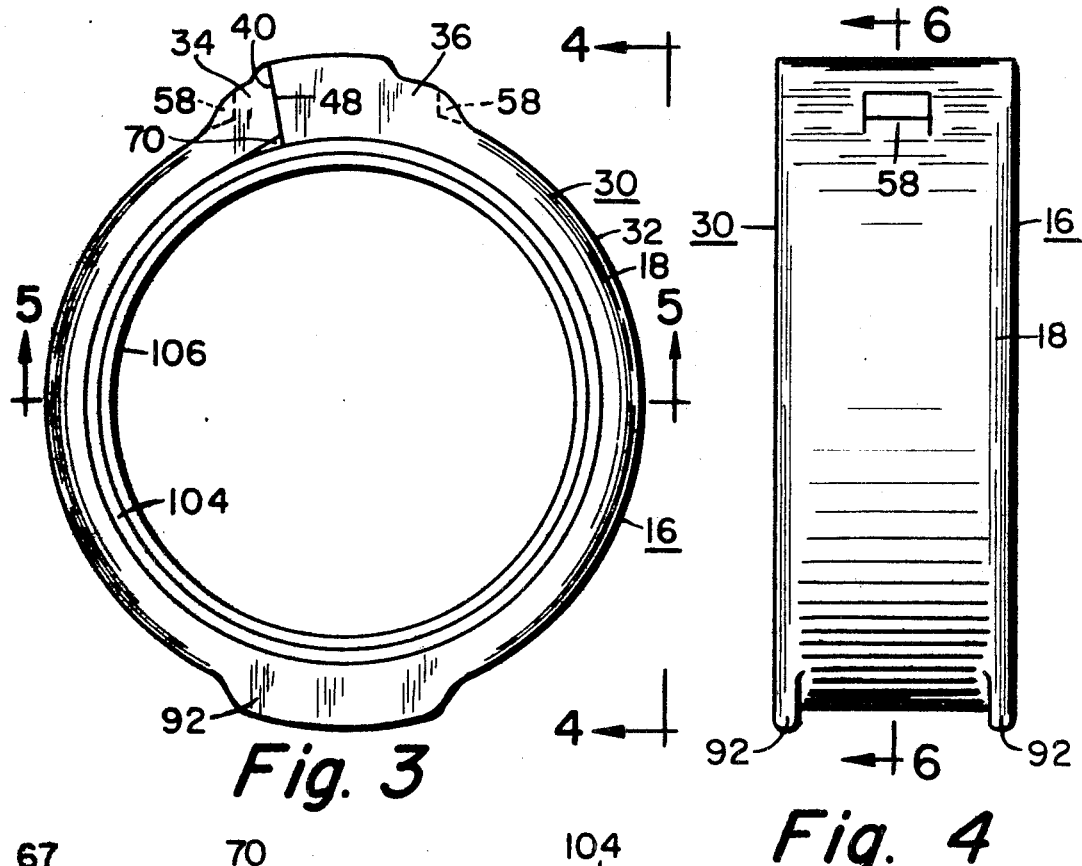
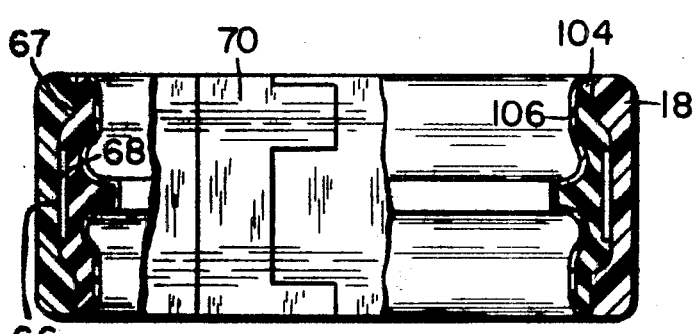

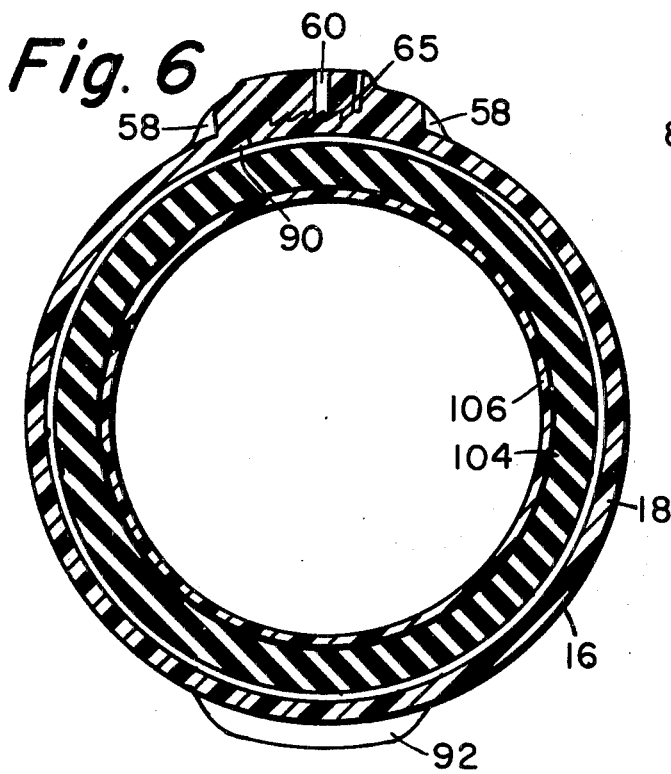
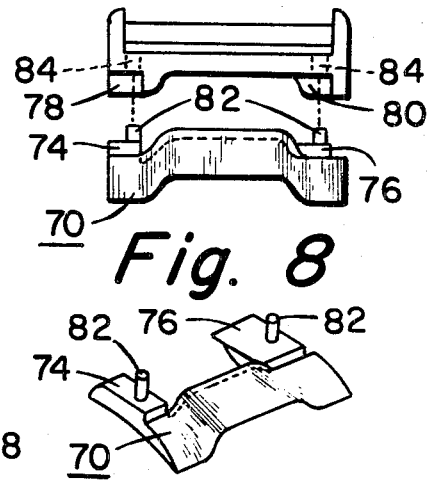
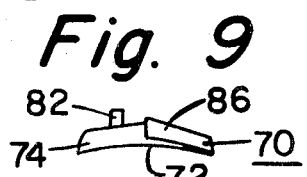
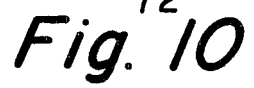
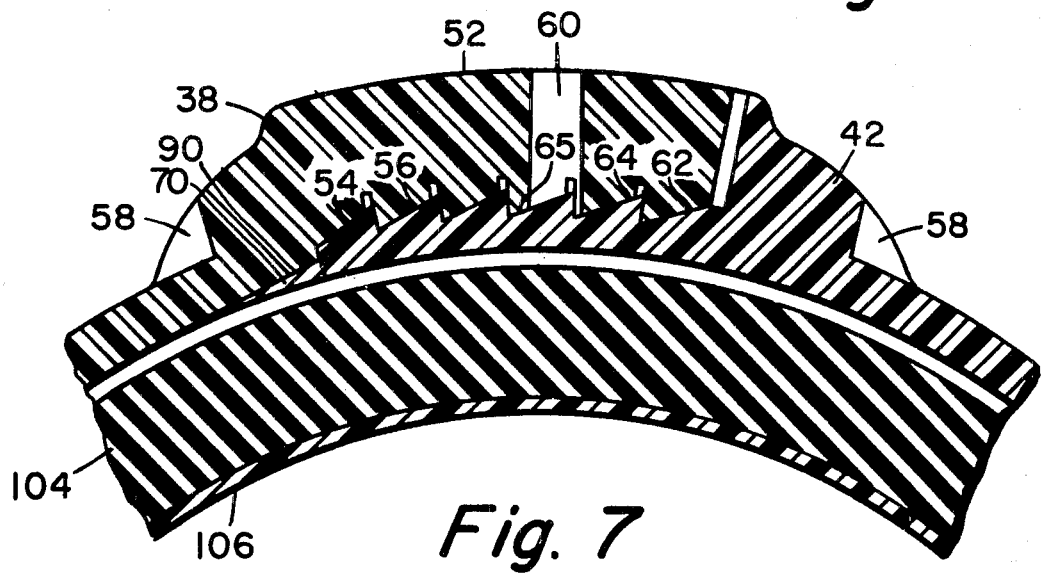
INVENTOR.
Carl J. Nelson
ATTORNEY INVENTOR.
Carl J. Nelson
BY
ATTORNEY

COUPLING

BACKGROUND OF THE INVENTION

The field to which this invention pertains is that of pipe couplings in fluid handling systems and more particularly, couplings having utility in joining glass pipe sections.

Previously, sections of prefabricated glass pipe, often with flared or beaded ends, have been utilized to form pipelines, with the flared or beaded ends facilitating interconnection of individual pipe sections as well as with similarly formed fittings. The pipe sections have often been connected by interposing a suitable annular gasket around and between the pipe end sections and applying a circumferential force thereto. An open-ended flanged metal collar or band is generally placed around the pipe end sections and drawn together by a nut and bolt assembly, with this collar or band often exerting considerable force upon the pipe end sections which are compressed against the interposed gasket. The collar or band is thus drawn together with sufficient force to prevent leakage around the gasket. Cushioning inserts or liners are many times employed between the metallic collar or band and the pipe ends in order to connect the latter to form rigid joint constructions.

The number of parts required and the time and effort for the installation of pipe joints employing this form of coupling are considerable. In addition, tightening of the nut and bolt assembly, which reduces the diameter of the collar or band to connect the pipe ends, occasionally results in glass breakage due to excessive and/or unbalanced forces being applied to the pipe ends. Even with the addition of a telescoping band member to produce more uniform loading, pipe couplings of this type, utilizing metal bands secured by a nut and bolt, or other retaining mechanisms such as a quick-release latch-type arrangement, may produce unbalanced stresses in the glass which can result in breakage due to vibration, thermal or physical shock, as well as expansion and contracting of the piping system while in service. Furthermore, the metal bands, unless of special composition or specially coated, are generally subject to corrosion. In addition, especially in pipes having beaded ends, dimensional control problems often arise so that the gaskets, even when utilizing inwardly directed center rib portions, do not properly seal on both the pipe bead portions and the generally cylindrical surface pipe end portions.

SUMMARY OF THE INVENTION

This invention solves the previously mentioned problems by utilizing a whole new concept in the design and structure of pipe couplings. It allows a softer seal approach (lower stress) which will adequately maintain the system's function while at the same time allowing the use of materials which prior to this concept could not be considered. This invention further allows for a mechanical end force, equivalent to five times the rated hydrostatic end force to be applied to the pipeline, without concern for pullout or high tensile stress which can be destructive to the pipe.

In summary, this invention relates to pipe couplings for joining two sections of a pipe having end portions disposed in generally adjacent but noncontacting relation, including a force-transmitting member in the shape of an annular resilient liner and preferably composed of an elastomeric material, surrounding the pipe end portion; and a flexible, generally cylindrical, one-piece band. Preferably the band is formed of reinforced thermoplastic material having inner and outer end sections. These end sections are capable of overlapping and have complementary locking means in the form of transversely extending integral teeth of a one-way ratchet-type design. The teeth are capable of stepped interlocking engagement over a predetermined distance upon the application of an external force. The band also includes a bridging means for maintaining an essentially continuous inner surface between the band sections over the predetermined distance, whereby upon application of the external force, the force development member joins the pipe sections and urges the force-transmitting member into sealing relationship with the pipe end portions. In addition, an annular barrier means, preferably in the form of a thin-film gasket of fluorofilm material, may be interposed between the liner and the pipe end portions. The liner includes multiple pressure-intensifying ridges in order to develop sufficient gasket factors, i.e., enabling seals to be made at the gasket-glass bead interface and at the interface between the gasket and the generally cylindrical surface pipe end portions.

BRIEF DRAWING DESCRIPTION

FIG. 1 is a top view of a coupling embodying this invention showing the locking means in a closed position.

FIG. 2 is a partial top view of the coupling of FIG. 1 but showing the locking means in an open position.

FIG. 3 is a side elevational view of the coupling of FIG. 1 looking in the direction of arrows 3 in FIG. 1.

FIG. 4 is an end view of the coupling looking in the direction of arrows 4 in FIG. 3.

FIG. 5 is a sectional view taken on line 5—5 of FIG. 3 with a portion of the gasket assembly broken away.

FIG. 6 is a sectional view taken on line 6—6 of FIG. 4.

FIG. 7 is an enlarged fragmental view of the closed locking means shown in FIG. 6 taken along line 7—7 of FIG. 1.

FIG. 8 is a slightly tilted front end view of the bridging means employed in the present coupling, as removed from its location on the locking means.

FIG. 9 is a perspective view of the bridging means of FIG. 8.

FIG. 10 is a side view of the bridging means of FIG. 8.

DETAILED DESCRIPTION

Figure 11:
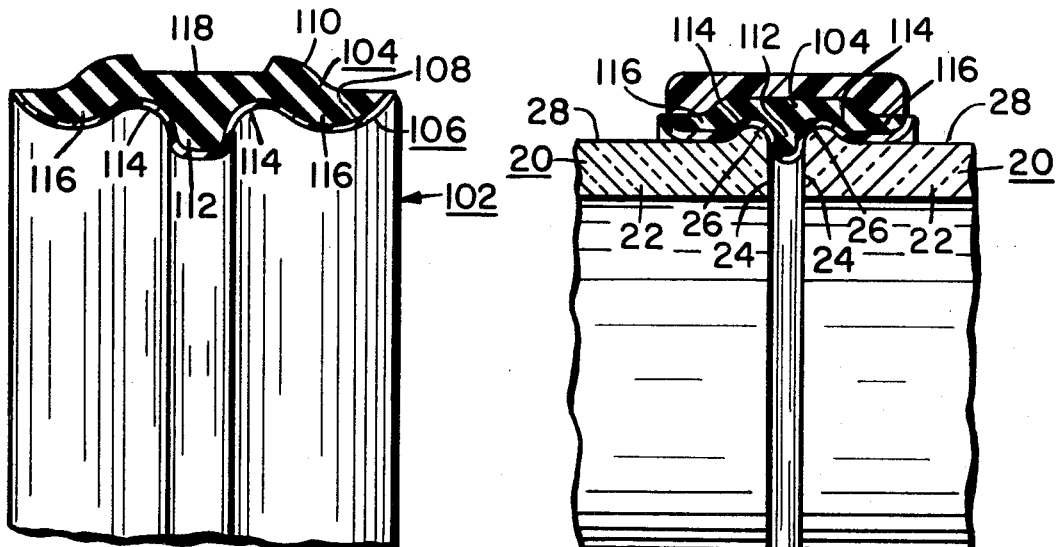
FIG. 11 is a fragmental sectional view of one of the preferred gasket-and-liners (in its uncompressed state) used in the present coupling.

Referring now to the drawings in detail, FIGS. 1, 3 and 4 are top, side and end views, respectively, of a coupling 16 of this invention which is comprised of a force development member 18, a force-transmitting member 104 and an annular gasket member 106.

Figure 12:
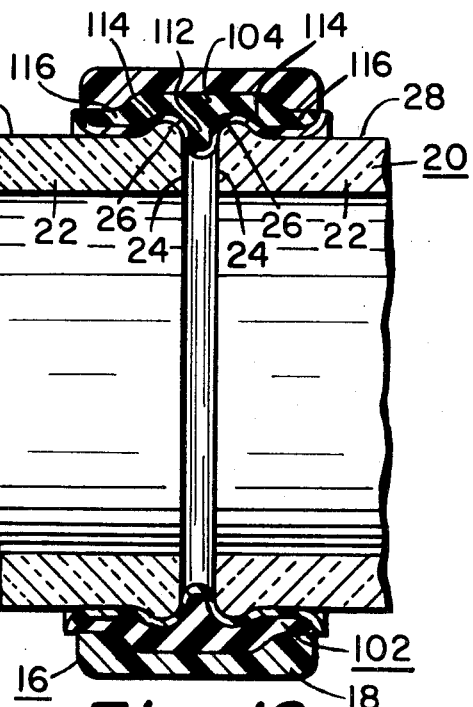
FIG. 12 is a sectional view similar to that of FIG. 5 but showing the coupling in sealed engagement with two pipe ends.

As best seen in FIG. 12, coupling 16 is used in joining end portions 22 of pipe sections 20 having end faces 24, beaded portions 26, and outer surfaces 28.

As best seen in FIGS. 1 to 10, force development member or shell 18 comprises two main portions including a generally cylindrical one-piece band 30 (FIGS. 1 to 7) and a bridging element 70 (FIGS. 8 to 10).

Generally cylindrical or annular one-piece band 30 is preferably injection molded and composed of a reinforced plastic material such as for example a nylon-base or a polypropylene-base material reinforced with a high tensile strength low-creep material such as glass or other fibers. One preferred material used in the manufacture of band 30 is a nylon-base material (sold commercially by the E. I. du Pont de Nemours Co. under the trademark "Zytel") reinforced with 30 percent (by weight) glass fiber. This material is capable of withstanding operating temperatures in excess of 300° F. and does not support combustion. Band 30 resists attacks of dilute acids, bases and salts, and accordingly does not require a protective coating as do most present couplings.

Band 30 has a generally cylindrical outer surface 32 which blends into boss portions 34 and 36 of outer and inner end sections 38 and 42 respectively. Band outer end section 38, being slightly narrower in width than the remainder of band 30, extends from the inner end surfaces 40 of boss portion 34 and is capable of overlapping band inner end section 42, which extends from the inner end surface 44 of boss portion 36. Band inner end section 42 has identical narrow outer wall portions 46 continuing from boss portion 36 and terminating with end surfaces 48. Wall portions 46 are designed to secure band outer end section 38 against excessive lateral movement and end surfaces 48 serve as an overlap-limiting means by abutting with surfaces 40 upon complete overlapping of band end sections 38 and 42.

Band outer end section 38 has a smooth upper surface 52 while its lower surface 54 is formed with a plurality of transverse inner teeth 56 (see FIG. 7). Band inner end section 42 has its upper surface 62 formed of a plurality of transverse outer teeth 64. The configurations of inner and outer teeth 56 and 64 are respectively complementary and are of a conventional one-way ratchet-type design. The engagement of teeth 56 and 64, defining locking means 65, permits a stepped series of interlocking engagements as band end sections 38 and 42 are overlapped upon the application of an outside generally circumferential force. Such force may be supplied by the use of a pair of conventional pliers whose jaws are partially inserted into grip ridges 58 on boss portions 34 and 36 when in the open position, as shown in FIG. 2, to thereby force band sections 38 and 42 to a locked position, as best shown in FIGS. 1, 6 and 7.

Teeth 56 and 64 are designed to be concealed when band 30 is fully closed, thereby making it difficult to open the band without the use of a special tool. This concealment is intentional in an attempt to reduce the number of leaks which might be caused by vandalism and/or tampering. In order to release band 30 from its locked position, a special tool, in the form of a conventional self-tapping sheet metal screw (not shown) of the proper size, is screwed into aperture 60 in band end section 38 for a distance sufficient to raise section 38 with respect to section 42, and thereupon allowing them to open at least one toothed step. Thereafter, or in the alternative, a screwdriver may be inserted into the opening between surface 44 and the end surface of section 38 to separate teeth 56 and 64 which thereby opens band 30. Wall portions 46 also serve to conceal the axial end faces of the engaged ones of teeth 56 and 64.

The inner surface 66 of band 30 (as best seen in FIG. 5) has symmetrical outer rib surfaces 67 which taper smoothly inwardly to blend into center recess surface 68. As may be readily visualized (and seen in FIG. 2), whenever band 30 is not fully closed, inner surface 66 will not be continuous, and a gap results between band end section end surfaces 40 and 48. If this gap were to remain in the installed position, such as shown in FIG. 12, liner 104 would be extruded into this gap and leakage would result. The locking or working range of band 30 varies from the engagement of two of each of teeth 56 and 64 to the engagement of all of teeth 56 with all of teeth 64.

In order to provide a continuous inner surface over the working range of band 30, a bridging element 70, best shown in FIGS. 8-10, is utilized. Bridging element 70 essentially is a slightly curved wedge-shaped or tapered piece having a lower surface 72 shaped similar to that of band inner surface 66. Bridging element rear supports 74 and 76 fit into complementary recesses 78 and 80 respectively in rib surfaces 67 of band end section 42 and blend smoothly thereinto. Bridging element locating pins 82 fit into apertures 84 in end section 42 and restrain element 70 against circumferential movement. Since the thickness of bridging element 70 tapers over its length span, a corresponding portion 90 (FIG. 6) of band inner surface 66, which is located below boss 34 and which mates with bridging element upper surface 86, is slightly relieved in order to provide a smooth fit. It should be noted however that due to the wedge shape of bridging element 70, as band 30 is closed, the cross section of band 30 in that area is actually slightly increased thereby providing a slightly higher pressure on liner 104.

It should of course be obvious that bridging element 70 may also be an integral part of band 30 and, be it integral or separate, may be attached to either of band end sections 38 or 42.

As the diameter of band 30 is reduced over the predetermined length of its working range, as previously discussed, the maximum bending moment takes place in an area almost diametrically across from locking means 65. Restraining rib portions 92 are located in this maximum bending moment area and help to keep band 30 generally cylindrical when it is fully closed.

FIG. 11 is a partial sectional view of one of the preferred gasket-and-liner assemblies which is used in coupling 16, with FIG. 11 showing gasket-and-liner 102 in its uncompressed state. FIG. 5 shows gasket-and-liner assembly 102 installed in shell 18 in its uncompressed state, whereas FIG. 12 shows it in a compressed state, interposed between shell 18 and pipe end sections 22. Gasket-and-liner assembly 102 is comprised of force-transmitting member or annular liner 104 and barrier or annular gasket 106, with gasket 106 covering all or part of liner interior surface 108. It should be noted that depending upon the application, environment and fluid to be handled, only liner 104 (without gasket 106) rather than gasket-and-liner 102 may be utilized. The resulting coupling (not shown) is identical to coupling 16 except for the deletion of gasket 106. Liner 104 is comprised preferably of a chemically resistant elastomeric material such as a rubber-base compound like Neoprene, an EPDM or similar polymer having a 40 to 60 Shore A hardness. These materials will support a given stress with only negligible longtime "set." This feature makes them desirable for use in the subject coupling, which generally receives no further physical adjustment after complete closure of locking means 65.

Annular gasket or barrier 106 is preferably comprised of fluorinated ethylene-propylene or polytetrafluoroethylene synthetic resin which is sold commercially by the E. I. du Pont de Nemours Co. under the trademark "Teflon." Alternatively this gasket may be comprised of polytrifluorochloroethylene sold commercially by the 3M Company under the trademark "Kel-F. Depending upon the particular service application of the subject coupling, the gasket may also be comprised of other high-melting-point resins or other organic resins such as polystyrene or polypropylene. Such synthetic resins are chemically stable up to temperatures of about 550° F. and are physically stable up to approximately 300° F.

Annular liner 104, having inner and outer surfaces 108, 110 respectively, also has inwardly projecting center rib portion 112, recessed portions 114 and wing portion 116. As best seen in FIG. 12, center rib portion 112 extends between pipe end faces 24, while recessed portions 114 surround pipe bead portions 26 and wing portions 116 surround pipe outer surfaces 28. Liner outer surface 110, which in its free state has a center recess portion 118, upon installation and compression by the closing of locking means 65, nearly completely follows the contour of band inner surface 66. As previously noted, liner inner surface 108 may be provided with thin annular gasket 106 which may or may not be attached thereto.

Figure 13A:
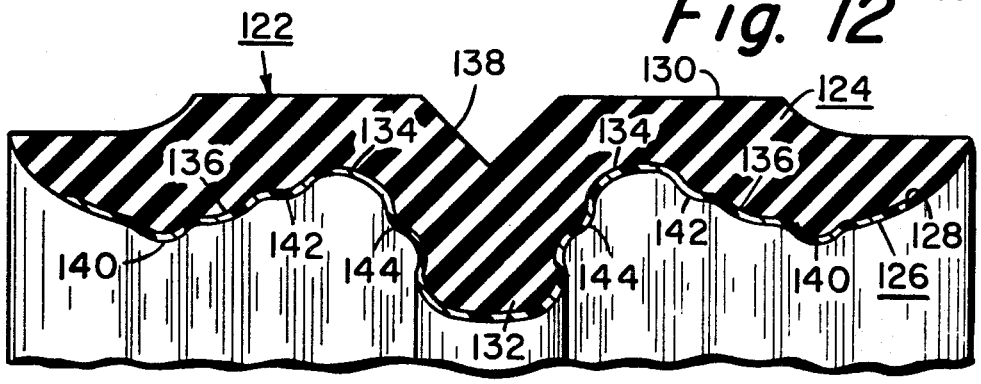
FIG. 13a is an enlarged fragmental sectional view of another of the preferred gasket-and-liner (in its uncompressed state) used in the present coupling.
Figure 13B:
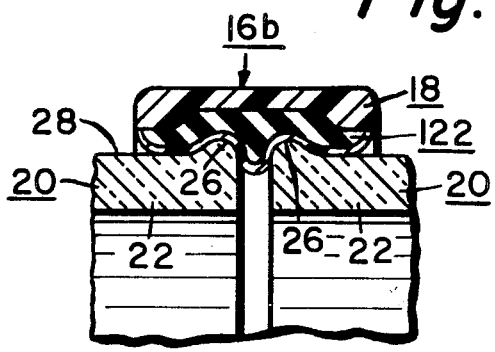
FIG. 13b is a fragmental sectional view of the gasket-and-liner of FIG. 13a in sealed engagement with two pipe ends.

FIG. 13a is a fragmental sectional view of a further embodiment of a gasket-and-liner assembly which may be used in this invention. FIG. 13b shows coupling 16b which is identical to coupling 16, except for the use of gasket-and-liner assembly 122 instead of gasket-and-liner assembly 102. Gasket-and-liner 122, which is very similar to the shape and composition on previously discussed gasket-and-liner 102, is comprised of annular liner 124 and annular gasket 126, with gasket 126 covering all or part of the liner inner surface 128. Again, liner 124 may be used without gasket 126 if so desired. The resulting coupling (not shown) is identical to coupling 16 except for the deletion of gasket 126.

Annular liner 124 in addition to inner surface 128 and outer surface 130, also has inwardly extending center rib portion 132, recessed portions 134, and wing portions 136. Liner outer surface 130 has a V-shaped center recess 138, and inner surface 128 has raised sealing or pressure-intensifying ridges 140 on the apexes of wing portions 136. Raised sealing or pressure-intensifying ridges 142 and 144 are located adjacent opposite ends of recessed portions 134. In the installed and compressed condition, as shown in FIG. 13b, liner outer surface 130 generally assumes the contour of band inner surface 66 and liner inner surface 128 generally conforms to the contours of pipe end portions 22. Depending upon the tolerances of pipe end portions 22 these raised sealing ridges, due to the resiliency of liner 122, may either partially or fully blend into a contour complementary to that of pipe end portions 22. Raised sealing ridges 140, and 142, 144 effectively act as individual seals on pipe outer surfaces 28 and pipe beaded portions 26, respectively.

Assembly of pipe end portions 22 of pipe sections 20 and coupling 16 is affected as follows:

Shell 18, comprising band 30 and bridging element 70, is assembled by manually spreading band 30 at least until inner and outer band section 38 and 42 abut, and inserting and attaching bridging element 70 to the inside of band end section 42 as previously described. Thereupon, gasket-and-liner 102 is fitted into shell 18, thereby completing the assembly of coupling 16. With coupling 16 still in the open position, first one and then the other of pipe section end portions 22 is inserted into the interior of coupling 16 until their beaded portions 26 are seated in liner recessed portions 114 and their end faces 24 are in contact with liner center rib portion 112. Coupling 16 is then closed by the application of an outside, generally circumferential force upon grip ridges 58 thereby effectively overlapping at least two each of teeth 64 and 56. This closing force effectively couples pipe sections 20 by retaining beaded portions 26 within band center recess surface 68. The generally circumferential closing force also exhibits a radial force component directly against end faces 24, beaded portions 26, and outer surface 28 of pipe end portion 22 to urge gasket-and-liner 102 into sealing relationships therewith. The assembly of coupling 16b is the same as that for coupling 16.

The opening of couplings 16 and 16b is accomplished by the use of a self-tapping sheet metal screw and screwdriver, as previously described.

When these couplings are used for joining pipes conveying fluids that are injurious to elastomeric liners then of course inert gaskets such as fluorofilm gaskets 106 or 126 must be utilized. In applications of this type gasket-and-liner 122 is preferred since its liner 124 has V-shaped center recess or relief 138 which has been found to give a more predictable elastomer flow. This is a necessary requirement to protect the fluorofilm gasket 126 from high stresses during the initial coupling installation. It should be noted that the elastic liners, which are the force-transmitting members, will yield with little force thereby causing and maintaining a stress against the pipes greater than that exerted by the maximum internal pipe pressure (22 p.s.i. gage). While couplings 16 and 16b have shown that they can produce a leakproof and pressuretight joint fully capable of retaining pressures up to 80 p.s.i. gage, such pressures are not recommended. Fluorofilm gaskets 106, 126 are the barriers between liners 104, 124 respectively, and the material being conveyed. These gaskets can either extend only from one pipe bead to the other pipe bead or can encompass the entire interior surface of the liner, with the latter being preferable. The gaskets, however, must be thin enough so that they react in the same manner as the liner, i.e., they must yield from low stress to conform to the pipe surface. As previously noted, the gaskets can be bonded to or remain free of the liners. The bonded concept however is more desirable in the case of thin films (0.002–0.010 inch) in order to force the gasket to conform to the pipe surface without buckling.

In addition, liner 124 has the added advantage of having intermediate and inner pressure-intensifying ridges 142 and 144 respectively, on each of liner inner surface recessed portions 134. Ridges 142, 144 are necessary in order to develop sufficient gasket factors, i.e., enabling seals to be made at the gasket-glass bead interface. In the event of undersized glass beads an additional set of outer ridges 140 is provided which will insure this seal, but will provide it on pipe outer surface 28.

Shell 18, due to the hygroscopic properties of its plastic material, can be moisture conditioned to a degree so that in most atmospheric installations it will shrink somewhat, thereby giving in effect a "plumber's assist," i.e., an increase in the sealing pressure being exerted against the pipes. For example, duPont "Zytel" material will absorb up to about 8 percent moisture (by weight) at 100 percent relative humidity. By driving in about 3 percent (of the shell weight) water after the molding of the shell, the moisture content of the 70 percent Zytel, 30 percent glass fiber shell will equalize at about 2.5 percent at a relative humidity of 50 percent. In addition to providing this "plumber's assist" the addition of water makes the shell more flexible and therefore easier to install, this being however at the expense of a slight decrease in the modulous of elasticity.

The joints produced by couplings 16 and 16b are not fully rigid but have some flexibility, having repeatedly withstood flexing of one of the coupled pipes through an angle of 6° for a period of 1,200 cycles, without leaking or rupturing of the gasket. Furthermore, as the pipes elongate, the liners are further compressed and the sealing pressure increases.

While the subject invention has been described mainly with reference to mechanical couplings for coupling glass pipes to glass pipes or glass pipes to pipes of other materials compatible for transporting fluids, it should be noted that with suitable modifications they can be adapted to almost any type of piping system in addition to glass drain lines.

The coupling concept of this invention when compared with most presently used couplings shown the following advantages:

A. Simple to close—does not require the use of torque or ratchet wrenches.
B. Precalculated seal—plumber has to insure engagement of only two or more teeth.
C. Lower yield stress—seal is made with less force.
D. Fewer components in assembly—three vs. generally seven.
E. Easily assembled while wearing gloves—a requirement in most chemical plants.
F. No protective shell covering required—resists attack of most dilute acids, bases and salts; does not support combustion.
G. Moisture conditioned—hygroscopic properties of shell can be utilized to increase the sealing pressure.
H. Tamper-resistant closing means—ratchet teeth are concealed to reduce tampering and/or vandalism.

While this invention has been described in connection with possible forms or embodiments thereof, it is to be understood that changes or modifications may be resorted to without departing from the spirit of the invention or scope of the claims which follow.

What is claimed is:

1. A force development member for use as part of an assembly for coupling beaded pipe end sections together, comprising:

a. a flexible, generally annular, one-piece band of reinforced thermoplastic material having a generally flat cylindrical outer surface and a contoured inner surface having symmetrical outer rib surfaces tapering smoothly inwardly to blend into a generally flat center recess surface, said band also having cooperatively positioned first and second end section, integral ratchet means formed on said end sections for releasably locking said band in a closed position, aid ratchet means including a plurality of outer stepped teeth on the outer surface of one of said end sections and a plurality of inner stepped teeth on the inner surface of the other of said end sections, said outer and inner stepped teeth being adapted to engageably overlap over a predetermined distance, for at least two each of said outer and inner teeth, to provide a desired locking effect upon the application of an external force, and one of said first and second end sections having spaced outer wall portions to secure the other of said end sections against excessive lateral movement as well as concealing the axial end faces of said engaged teeth; and b. a generally wedge-shaped bridging means of reinforced thermoplastic material, said bridging means having a lower surface that is shaped similar to and blends in with the contoured inner surface of said band thereby maintaining an essentially continuous inner surface between said band end sections over said predetermined distance, with the inner surface of at least one of said first and second end sections being recessed and relieved so as to permit the smooth fitment of said bridging means.

2. A force development member as defined in claim 1 wherein said reinforced thermoplastic material is a nylon-base material reinforced with a predetermined amount of glass fiber, said material being capable of withstanding operating temperatures in excess of 300° F. and capable of resisting attacks of dilute acids, bases and salts.

3. A force development member as defined in claim 1 wherein said band incorporates at least one external stiffening rib, in the area of its maximum bending moment, in order to keep said band generally cylindrical upon closure thereof.

4. A force development member as defined in claim 1 wherein said band is moisture conditioned by the incorporation therein of a predetermined amount of water so that under most atmospheric conditions it will shrink slightly, thereby providing an increase in the sealing pressure being exerted against said pipe end sections.

5. A coupling for joining the adjacent ends of two generally cylindrical sections of pipe having beaded end portions disposed in axially aligned, noncontacting relation, aid coupling comprising:
  a. an annular resilient liner, composed of an elastomeric material, surrounding said adjacent pipe ends, said liner having a profiled outer surface and an inner surface, said inner surface including an inwardly projecting center rib portion extending between said adjacent pipe ends two recessed portions substantially surrounding said beaded pipe end portions and two outwardly tapered wing portions surrounding the cylindrical portions of said pipe ends; and
  b. a force development member surrounding the outer surface of said liner and including:
    1. a flexible, generally annular, one-piece band of reinforced thermoplastic material having a generally flat cylindrical outer surface and a contoured inner surface having symmetrical outer rib surfaces tapering smoothly inwardly to blend into a generally flat center recess surface, said band also having cooperatively positioned first and second end sections, said end sections having pluralities of integral, complementary, transversely extending stepped teeth capable of engageably overlapping over a predetermined distance, for at least two each of said teeth, in a series of interlocking engagements upon the application of an external force, with one of said first and second end sections having outer wall portions to secure the other of said end sections against excessive transverse movement; and
    2. a bridge strip of reinforced thermoplastic material attached to one of said band first and second end sections, said bridge strip having a lower surface that is shaped similar to and blends in with the contoured inner surface of said band thereby maintaining an essentially continuous inner surface between said band end sections during said series of interlocking engagements, whereby upon application of said external force, said force development member urges the profiled outer surface of said liner into assuming the general contour of said band inner surface and said liner inner surface is urged into sealing and coupling relationships with said pipe end sections.

6. The coupling of claim 5 wherein said resilient liner has a first raised annular pressure-intensifying ridge on each side surface of said inwardly projecting center rib portion, said first ridges enabling sealing relationships to be made at the liner-center-rib to pipe-end interface.

7. The coupling of claim 6 wherein said resilient liner has a second raised annular pressure-intensifying ridge in the area of each of said liner-recessed portions, with each of said second ridges enabling a sealing relationship to be made at the liner-recessed portion to pipe-beaded-end-portion interface.

8. The coupling of claim 7 including a generally annular barrier means interposed between said liner inner surface and said pipe ends, said barrier means comprising a thin-film gasket of fluorofilm material which is integral with said liner inner surface and is of predetermined thickness so that it reacts and yields from low stress to conform to the pipe surfaces, without buckling, in the same manner as said liner.

9. The coupling of claim 5 wherein the external surface of said band includes at least one arcuate stiffening rib in the area of its maximum bending moment, in order to keep said band generally cylindrical upon closure thereof.

10. The coupling of claim 5 wherein said band is moisture conditioned by the incorporation therein of a predetermined amount of water so that under most atmospheric conditions it will shrink slightly, thereby providing an increase in the sealing pressure being exerted against said pipe ends.

* * * * *